July 12, 1960     J. L. FRIEBURG     2,944,377
SIDE DELIVERY HAY RAKE

Filed April 30, 1959     2 Sheets-Sheet 1

John L. Frieburg
INVENTOR.

July 12, 1960   J. L. FRIEBURG   2,944,377
SIDE DELIVERY HAY RAKE
Filed April 30, 1959   2 Sheets-Sheet 2
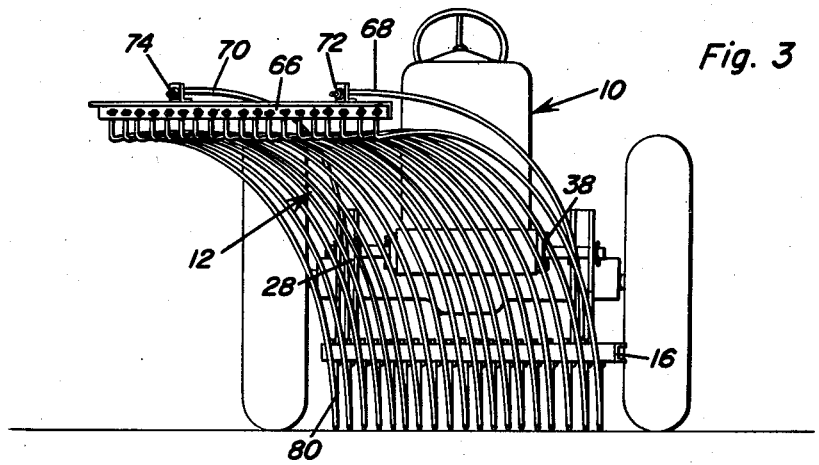
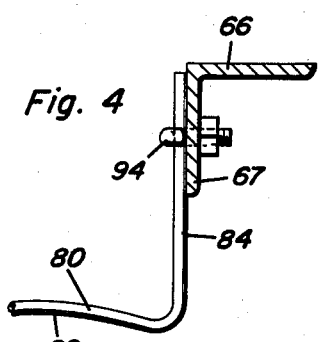
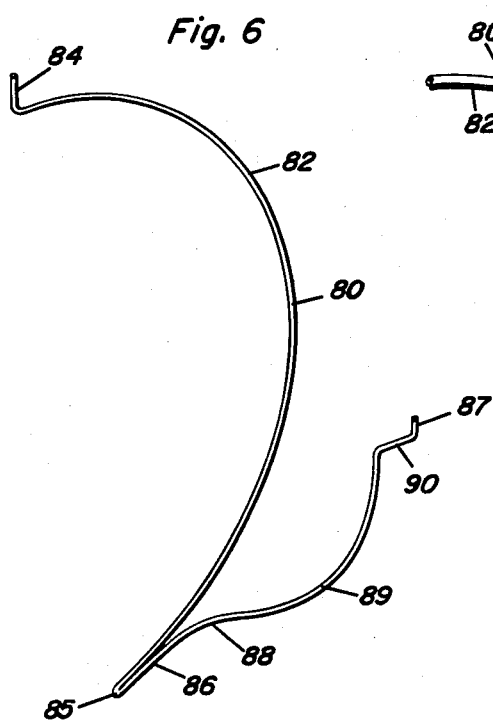
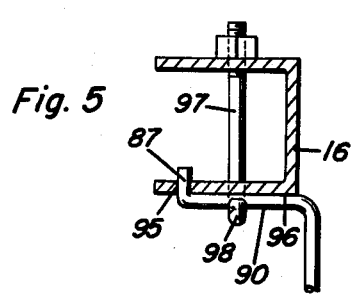
John L. Frieburg
INVENTOR.

2,944,377
Patented July 12, 1960

2,944,377
SIDE DELIVERY HAY RAKE
John L. Frieburg, 105 N. East St., Le Roy, Ill.

Filed Apr. 30, 1959, Ser. No. 810,090

3 Claims. (Cl. 56—376)

This invention relates to agricultural implements and more particularly to rakes.

An object of the invention is to provide a side delivery hay rake that will gather the hay from the the swath on the ground after drying without scattering the leaves and leave a windrow. The side delivery hay rake may also be used to turn windrowed hay or grain for drying.

Briefly, the side delivery hay rake is mounted at the front end of any tractor and as the tractor moves forward the hay will force its way up and over to be discharged in a windrow.

An important feature of the invention is found in the tines. They are made of spring metal, for example spring steel and are fastened at their lower end behind the front so that the hay will not have any place to catch onto. A portion of each tine contacts the ground to keep the front of the tine from digging into the ground.

Accordingly, another object of the invention is to provide a hay rake with what is considered to be a unique tine configuration to improve the handling of hay, grain and the like as it is turned or otherwise moved during normal farming operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a front view of the side delivery hay rake and tractor in Figure 1.

Figure 4 is an enlarged fragmentary sectional view taken on the line 4—4 of Figure 1 and showing a detail of construction.

Figure 5 is an enlarged fragmentary sectional view taken approximately on the line 5—5 of Figure 1.

Figure 6 is an enlarged perspective view of one of the tines.

Figure 1:
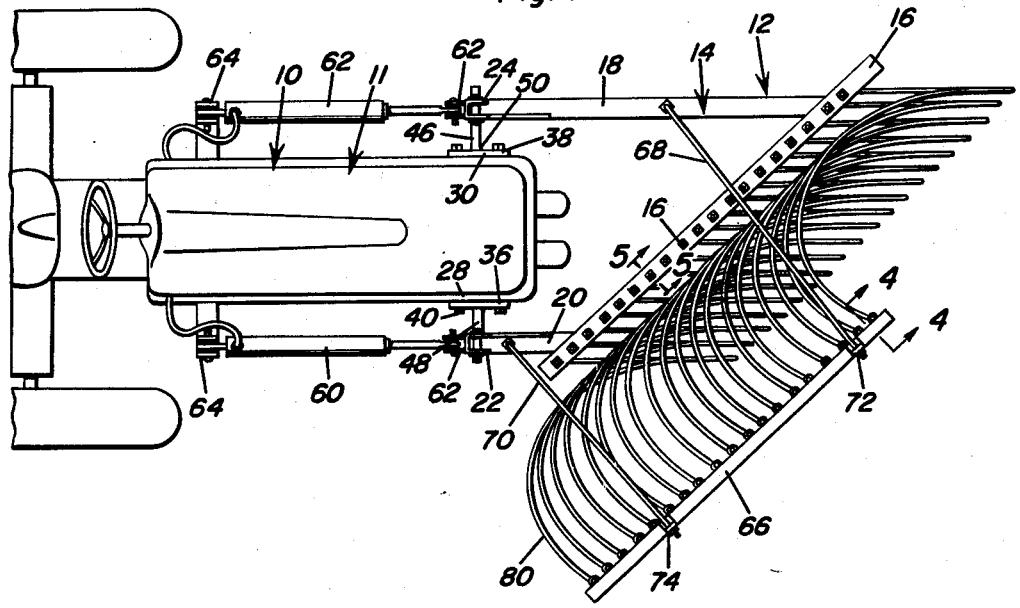
Figure 1 is a fragmentary top plan view of a conventional tractor equipped with a side delivery hay rake constructed in accordance with the invention.

In the accompanying drawings there is shown a conventional tractor 10 which diagrammatically represents any manufacturer's make or type of tractor with which a side delivery forward mounted hay rake may be used. Hay rake 12 is shown mounted at the front of tractor 10. The hay rake 12 is one exemplifying embodiment of the invention and includes a frame 14 made of a member 16 e.g. a rearwardly opening channel to which frame members 18 and 20 are rigidly secured. Frame members 18, 20 and 16 may be made of channel construction or some other conventional frame member configuration, and the inner ends thereof i.e. the ends closest to tractor 10, have upstanding frame members 22 and 24 fixed thereto by conventional fastening means, for instance welds 26.

A pair of identical mounting brackets 28 and 30 are used to connect the upstanding frame members 22 and 24 to the sides of the tractor near the front thereof. The mounting brackets consist of mounting plates 36 and 38 connected by bolts 40 or the like to the frame 11 of tractor 10. There are a pair of spindles 46 and 48 which are fixed to the mounting brackets 38 and 36, as by welds 50, and the spindles are coaxial and horizontal when the tractor is resting on a horizontal surface. Spindles 48 and 46 extend through apertures 54 in the upstanding frame members 22 and 24, and there is a fastener, for instance, cotter key 56 at the end of each spindle preventing the frame members from sliding therefrom. The spindles, mounting brackets and apertures in the upstanding frame members 22 and 24 mount the frame of the hay rake 12 for pivotal movement about the longitudinal axis of spindles 46 and 48.

In order to pivotally actuate the frame of the hay rake and consequently the entire hay rake, conventional means are operatively connected with the frame of the rake. These conventional means are shown as hydraulic cylinders 60 pivoted at one end on brackets 62 which are welded as at 63 or otherwise secured to frame members 22, 24. The opposite ends of the hydraulic cylinders are pivotally connected to depending brackets 64 attached to the tractor frame 11. The hydraulic system of the tractor is operatively connected to the hydraulic cylinders in order to actuate the same.

The frame of the hay rake further includes an angle member 66 mounted above frame member 16 (Figure 2) and approximately parallel thereto. Curved support rods 68 and 70 are connected by mounting brackets 72 and 74 to the frame member 66 and are connected to frame members 18 and 20 by means of nuts 76 attached to spaced places on the braces 68 and 70 and fitting on the top and bottom surfaces of members 18 and 20. To achieve the holding effect the lower ends of braces 68 and 70 are passed through aligned apertures in the frame members 18 and 20. It is pointed out that the specific means for fastening together the various parts may be varied without departing from the invention.

Attention is now invited principally to Figures 4, 5 and 6. These show the construction and shape of the tines 80 of the rake 12 and the way that they are preferably attached to frame members 66 and 16. Typical tine 80 is made of spring steel or other metal and has a smoothly curved arcuate part 82 with an upstanding end 84 which is very short in comparison to the length of the arcuate part 82. The arcuate part has a lower end 85 which is bent at 180° so that part 86 of the tine is parallel thereto for short distance. Continuing toward end 87, the tine has a slight downwardly curved portion 88 and then an upwardly curved portion 89 at the end of which there is a short straight extension 90. End 87 projects upwardly at right angles to the short straight portion 90.

The end 84 fits flush against the vertical flange 67 of frame member 66 and is held in place by means of a U-bolt 94, hook or the like which is attached to flange 67. End 87 extends through an aperture 95 in the lower flange of frame member 16, and the straight portion 90 fits flush against the bottom surface 96 of the lower flange of frame member 16. A hook 97, or the like extends through aligned apertures in the upper and lower flanges of frame member 16 and has the curved part 98 thereof engaged around the straight part 90 of the tine.

Figure 2:
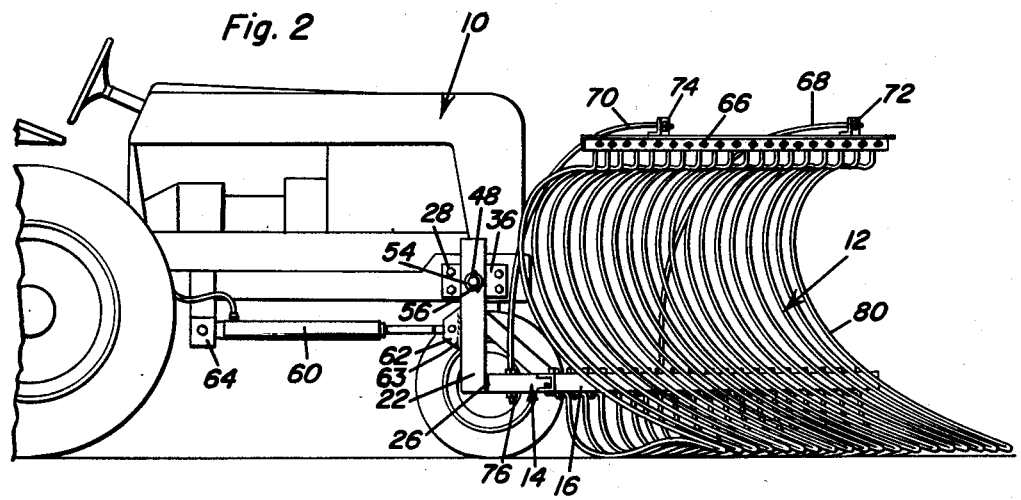
Figure 2 is a fragmentary side elevational view of the tractor in Figure 1 showing principally the appearance of the side delivery hay rake from one side thereof.

The tines are oriented in parallel relationship, and the end portions 85 project forwardly (see Figure 2).

The curved parts 89 are ground engaging. They ride along the surface of the ground to prevent the ends 85 from digging into the ground.

The preferable mounting for the rake 12 is to have it as a side delivery hay rake at the front of a tractor. Accordingly, it is arranged so that the frame members and tines are at an angle to the longitudinal axis of the tractor 10 so that the hay rake will be capable of windrowing or turning material in a windrow. The material, for instance, hay, grain, etc. rides up the inclined part of the tines of the hay rake that is, the lower parts of the smoothly curved portions 82 and in riding up, the material turns over upon itself thereby continually rolling as the tractor moves forward. Wheels on member 16 can be used for added support.

Figure 7:
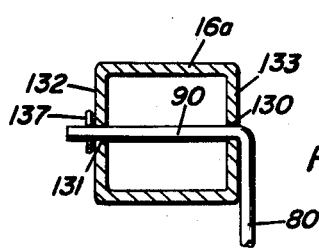
Figure 7 is a sectional view showing a modification of one of the frame members.

Figure 7 is a sectional view showing a modification of the frame member 16. The modified frame member 16a is a box beam having aligned apertures 130 and 131 in the front and rear walls 132 and 133 thereof. Tines 80a differ from tines 80 by having the ends 90 extended through apertures 130 and 131 and parts 87 of tines 89 omitted. Cotter pins 137 or the like are used to retain ends 90 in member 16a.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a side delivery hay rake, the combination of spaced upper and lower horizontal frame members disposed in parallel relation with the upper member spaced forwardly from the lower member, and a set of spaced parallel tines carried by said frame members, each of said tines including a vertical upper end portion secured to the upper frame member, a relatively long curved intermediate portion extending first rearwardly and then downwardly and forwardly from said upper end portion to a point below and forwardly of the lower frame member, a reversely bent portion provided at the lower end of said curved intermediate portion, a curved lower portion extending first rearwardly and downwardly and then upwardly from said reversely bent portion, and a lower end portion on said curved lower portion secured to said lower frame member.

2. The device as defined in claim 1 wherein said curved lower portion is adapted to engage the ground at a point below the lower end of said arcuate intermediate portion, whereby said lower end of the intermediate portion is spaced upwardly from the ground.

3. The device as defined in claim 1 together with clamp means provided on said upper and lower frame members and securing said upper end portions and said lower end portions, respectively, of said tines thereto.

References Cited in the file of this patent

UNITED STATES PATENTS

| | | |
|---|---|---|
| 358,735 | Doan | Mar. 1, 1887 |
| 541,169 | Kimball et al. | June 18, 1895 |
| 2,667,730 | McCall et al. | Feb. 2, 1954 |
| 2,744,377 | McCall et al. | May 8, 1956 |